3,197,279
METHOD OF MAKING SYNTHETIC MICA AND CERAMOPLASTIC MATERIALS
Philip S. Hessinger, West Caldwell, and Thomas W. Weber, Woodbridge, N.J., assignors to Mycalex Corporation of America, Clifton, N.J., a corporation of New York
No Drawing. Filed Oct. 17, 1963, Ser. No. 317,050
24 Claims. (Cl. 23—110)

The present application is a continuation-in-part application of our earlier filed applications Serial No. 173,353 and Serial No. 173,369, both filed February 15, 1962, and both now abandoned.

This invention relates to a method of making synthetic mica and particularly to a method of making synthetic fluor-phlogopite mica, and to a method of manufacturing ceramoplastic embodying the novel method of making synthetic mica.

In recent years practical methods of manufacturing synthetic mica have been developed. Basically, the methods employed for making synthetic mica are to introduce into a furnace shell raw batch materials of such composition that they provide the necessary molecular percentages for the final mica product, heating said raw materials until the raw materials melt, and thereafter cooling the materials to permit the mica to crystallize out of the liquid melt. Substantially 100% of the final pig is mica. The preferred method of heating the batch materials is by internal resistance heating such as is disclosed in U.S. Patent No. 2,711,425, issued to R. A. Humphrey on June 21, 1955, for Electric Furnace and Electric Melting and Crystallizing Method for Minerals. The final mica made by the Humphrey method or other similar methods is in the form of a huge chunk or pig which is difficult to break up into usable plate-like crystals of mica. The chunk or pig of synthetic mica resulting from the Humphrey method is extremely tough and resists breaking up into the plate-like crystals which are commercially usable. Various methods of breaking up such a pig have been employed but most of them result in the breaking up of relatively large crystals into small crystals which have less commercial value. Moreover, in the Humphrey patent it is necessary to achieve temperatures in the furnace equal to or above the melting temperature of the mica being made. These temperatures are extremely high. For instance, the melting point of fluor-phlogopite mica is 1365° C.

It is therefore one object of the present invention to provide a new and improved method for manufacturing synthetic mica.

Another object of the present invention is the provision of a new and improved method for manufacturing synthetic mica, wherein the crystal growth of the synthetic mica can be closely controlled.

Still another object of the present invention is the provision of a new and improved method for manufacturing synthetic mica, which method permits said manufacture at temperatures below the melting point of the mica.

Yet another object of the present invention is to provide a method of crystallizing mica.

Another object of the present invention is to provide a method of crystallizing mica from a solvent therefor.

A further object of the present invention is to provide a method of recrystallizing mica.

Still a further object of the present invention is to provide a method of recrystallizing synthetic mica from a solvent therefor.

Yet a further object of the present invention is to provide a method of recrystallizing synthetic non-hydroxyl mica, such as fluor-phlogopite mica.

Another object of the present invention is the provision of an improved method of making ceramoplastic materials.

Another object of the present invention is the provision of a method of making improved ceramoplastic materials.

The above and other objects, characteristics and features of the present invention will be more fully understood from the following detailed description.

Mica is a siliceous crystalline mineral which is commonly found in nature. Most of the mica found in nature includes water of constitution or hydroxyl (OH) ions. An example of a hydroxyl mica is muscovite mica which has the formula $KAl_3Si_3O_{10}(OH)_2$. The aforementioned Humphrey method is best adapted to make non-hydroxyl micas, that is, micas wherein ions other than hydroxyl replace or are substituted for the hydroxyl ions generally found in natural mica. The most common substitute for the hydroxyl ions are ions of the halogen group, preferably fluorine. Perhaps the most common mica made synthetically is normal fluor-phlogopite mica which has the chemical formula $KMg_3AlSi_3O_{10}F_2$. Other examples of non-hydroxyl micas are lithium tetra-silicic fluor-phlogopite mica which is expressed by the formula $KMg_2LiSi_4O_{10}F_2$ and barium di-silicic fluor-phlogopite which is expressed by the formula $BaMg_3Al_2Si_2O_{10}F_2$.

Numerous other non-hydroxyl micas may be made. As is true with the Humphrey method, the present method is adapted for manufacturing synthetic non-hydroxyl micas such as, for instance, synthetic normal fluor-phlogopite mica. The following detailed description of the method forming the present invention will be in connection with the manufacture of synthetic normal fluor-phlogopite mica. However, it will be understood that the present method may also be employed to manufacture other synthetic non-hydroxyl micas such as, for instance, those mentioned above.

In the following description and in some of the claims annexed thereto, the term "mica forming material" will be employed. As used herein, the term "mica forming material" will mean mica and non-micaceous materials which are combinable to form mica.

We have recently discovered that non-hydroxyl mica forming material such as normal fluor-phlogopite mica or materials stoichiometrically equivalent thereto are soluble in lead fluoride and will precipitate therefrom. With this discovery, a means and method for crystallizing and recrystallizing synthetic normal fluor-phlogopite mica is present.

In accordance with one embodiment of the present invention, a batch of raw materials which have the stoichiometric content of mica and which are combinable to form mica are dissolved in molten lead fluoride and after the batch materials have gone into solution, the lead fluoride solution may be cooled whereby to saturate the solution and cause mica crystals to precipitate out of solution. Numerous combinations of batch materials may be employed for making any given mica. An example of raw batch which has the various constituents of normal fluor-phlogopite mica in proper stoichiometric proportions is presented below:

| | Percent |
|---|---|
| Potassium silico fluoride ($K_2SiF_6$) | 19.77 |
| Potash feldspar ($KAlSi_3O_8$) | 18.47 |
| Silica ($SiO_2$) | 24.26 |
| Alumina ($Al_2O_3$) | 8.95 |
| Magnesia (MgO) | 28.55 |

Other combinations of raw materials forming a mica batch may readily be worked out by anyone skilled in the art.

In accordance with another embodiment of the present invention, normal fluor-phlogopite mica crystals are ground to a very fine powder, preferably sufficiently fine to pass through a 100 mesh sieve. The powdered normal fluor-phlogopite mica is then mechanically mixed with powdered lead fluoride preferably sufficiently fine to pass through a 100 mesh sieve.

The method of the present invention is identical for both types of mica forming materials. Thus, after the lead fluoride and the mica forming material have been well mixed by any suitable mechanical means or by hand mixing, the mixture is put into a container such as a platinum or ceramic crucible and heat is applied. The method of heating may be any suitable method but, preferably, the crucible containing the mixture of mica forming material and lead fluoride is placed in an oven.

Lead fluoride melts at about 855° C. At 1150° C. the lead fluoride will dissolve about 30% by weight of mica forming material; at 1200° C. the lead fluoride will dissolve about 40% by weight of mica forming material; and at 1250° C. the lead fluoride will dissolve about 60% by weight of the mica forming material. At 1365° C. as much mica as desired can be put into solution as normal fluor-phlogopite mica is liquid at that temperature. We prefer to heat the mixture to about 1200° C. at which temperature the lead fluoride solvent will dissolve about 40% by weight of the mica forming material since at this temperature lead will not volatilize out of the lead fluoride to thus create a substantial health hazard.

The mixture is held at the preferred temperature (1150° C. to 1250° C. and preferably at 1200° C.) preferably until all of the mica forming material is dissolved in the molten lead fluoride. The complete dissolution of the mica batch in the lead fluoride may be determined by removing a small amount of the molten material and rapidly quenching it, such as in water. Thereafter, a microscopic examination of the quenched material will reveal whether any raw material crystals are present. If no raw material crystals are present, then it may be presumed that all of the mica batch has been dissolved. On the other hand, the complete dissolution of the powdered synthetic mica in the lead fluoride may be determined by quenching and determining by microscopic examination whether any mica crystals are present. Similarly, if no mica crystals are present then it may be presumed that all of the mica has been dissolved. However, if there are some raw material crystals or synthetic mica crystals still present, then the molten mixture is maintained at the desired temperature until the quench test indicates either total dissolution of the entire mica forming material, or that no more mica forming material can be dissolved.

After the mica forming material has been dissolved in the molten lead fluoride, the furnace may be shut off so as to permit a cooling of the entire molten mixture. As the solution cools, it, of course, is unable to hold in solution as much mica forming material as it was able to hold at the predetermined temperature. Accordingly, in one case the dissociated ions from the raw batch materials combine to form mica crystals, which precipitate or crystallize out of the molten lead fluoride. In the other case, the dissociated ions from the ground up mica combine to form synthetic mica crystals which precipitate or recrystallize out of the molten lead fluoride. Since the mica crystals in both instances have a much lower specific gravity than the lead fluoride, they tend to rise to the top where they may be scooped off.

The sizes of the mica crystals precipitating out of the solution may be controlled by controlling the rate of cooling, the slower the cooling the larger the crystals. If desired, the contents of the crucible may be cooled to some predetermined temperature such as, for instance, 1200° C., and maintained at said temperature to permit the slow crystallization or recrystallization of the mica out of the solution and to further permit mica crystals to rise to the top of the relatively heavy lead fluoride. The holding temperature is dependent on the amount of mica forming material in solution and the amount of mica it is desired to get out of solution. The temperature at which the solution is held during the crystallizing or recrystallizing period should be such as to provide a molten lead fluoride which is sufficiently viscous to prevent its flowing through the pores of the crucible but not so viscous as to retard the growth of the mica crystals.

We have further found that as the mica crystallizes or recrystallizes out of the lead fluoride, the lead fluoride tends to get less viscous, provided the temperature is held constant. Accordingly, as another alternative embodiment of the present invention, instead of maintaining the solution at a constant temperature during the period of crystallization, the temperature of the solution may be gradually lowered whereby to maintain a constant viscosity of the liquid phase of the solution.

In lieu of mixing the ground lead fluoride with the powdered mica forming material before heating, the lead fluoride may be heated to the desired temperature and said mica forming material may be then introduced into the molten lead fluoride where it is dissolved as described above. In order to get a maximum amount of mica forming material into solution, it is desirable to stir the liquid while introducing the raw batch materials into already melted lead fluoride, that a more rapid dissolution of the mica batch material can be obtained by adding the oxides, i.e. $SiO_2$, $Al_2O_3$ and $MgO$, before adding the potassium silico fluoride and potash feldspar.

Regardless of whether or not the mica forming material is introduced before the lead fluoride is melted or after the melting of the lead fluoride, the present method can be made continuous by adding mica forming material to the molten liquid after mica crystals have been removed from the solution as by scooping them off the top thereof and then raising the temperature of the liquid to dissolve the additional material. Accordingly, the entire method can be made to operate on a continuous basis and, in fact, it is possible to automatically control the entire process so that after the molten lead fluoride solution has been cooled to precipitate out mica, apparatus may be actuated to add mica forming material and then to raise the temperature of the solution and hold the solution at an elevated temperature until all the mica forming material is dissolved, and thereafter, to lower the temperature of the solution to precipitate out additional mica crystals.

In lieu of scooping the mica crystals off the top of the lead fluoride solution as described above, the lead fluoride with the mica crystals dispersed therein may be slowly cooled to a temperature where it hardens. Thereafter, the lead fluoride may be dissolved in any suitable solvent such as a 5% solution of acetic or nitric acid, which solvent will not attack the mica. Accordingly, the lead fluoride will be removed by the solvent and the mica crystals will remain.

It should be understood that as used herein the term "crystallization" is meant to include the term "recrystallization." That is, if the mica forming material is itself mica then what is actually achieved by this method is first a dissociation of the mica and then a reforming of the mica crystals which may be termed "recrystallization." This is to be contrasted with the formation of mica crystals by the dissolution of non-micaceous raw batch materials stoichiometrically equivalent to mica and then the formation of mica crystals from the dissociated ions of the raw batch material, which latter process may specifically be denoted as crystallization. However, for convenience, and since the actual formation of the crystals in both the instances comes from dissociated ions the word "crystallization" is deemed to cover both.

The present method has a number of advantages over the methods hereinbefore employed to make synthetic mica. Among these advantages are the fact that the rate of crystallization or recrystallization of the mica can be controlled by controlling the temperature of the solution and the viscosity thereof. Moreover, by controlling the rate of cooling, the size of the mica crystals can be controlled. Another important advantage of the present invention is that the manufacture of synthetic mica can take place at temperatures hundreds of degrees below the temperature heretofore necessary to manufacture synthetic mica. Another additional advantage of the present invention, as has been pointed out hereinbefore, is that the present method for making synthetic mica can be substantially continuous as contrasted with the batch methods heretofore employed.

Although the detailed description presented above was confined mainly to crystallizing and recrystallizing synthetic normal fluor-phlogopite mica, it will be understood that the above method will work for other non-hydroxyl micas, such as other synthetic fluor-micas.

As stated hereinbefore, the method for making synthetic mica described above may be employed in a method for manufacturing ceramo-plastic, that is, a material having a disperse phase of synthetic mica bonded by glass. In making ceramoplastic in accordance with the present invention mica forming material is mixed together with lead fluoride, both preferably in finely powdered form. The mixture is then heated as in an oven to a temperature preferably between 1150° C. and 1250° C. The ratio of the amount of the mica forming material to the amount of lead fluoride depends upon the temperature to which mixture is heated. This stems from the fact that lead fluoride will dissolve larger quantities of the mica forming material at higher temperatures. For instance, if the mixture is heated to 1150° C., the lead fluoride will dissolve about 30% by weight of the normal fluor-phlogopite mica forming material. At 1200° C. the lead fluoride will dissolve about 40% by weight of the mica forming material and at 1250° C. the lead fluoride will dissolve about 60% by weight of the mica forming material. At 1365° C., as much mica as desired may be introduced into solution as the mica is molten at that temperature. We prefer to heat the mixture to about 1200° C., at which temperature the lead fluoride will dissolve about 40% by weight of the mica forming material. Above 1200° C. the lead tends to volatilize and this creates a substantial health hazard. Accordingly, from practical commercial considerations it is inadvisable to heat the mixture of the mica forming material and lead fluoride to temperatures above 1200° C.

Preferably the ratio of the amount of the mica forming material to the amount of lead fluoride is precisely that which will result in a saturated solution at the temperature to which the mixture is going to be heated. When the mixture is brought to the desired temperature such as preferably 1200° C., it is maintained at said temperature until all of the mica forming material has been dissolved in the lead fluoride. A determination of complete dissolution of the mica forming material may be made by removing a small portion of the solution and quenching it. Thereafter, microscopic examination of the quenched material will indicate whether any of the batch materials are present as crystals or whether any mica particles are present. In either event complete dissolution of the mica forming material has not been achieved. If no batch or mica particles are present in the quenched material, then complete dissolution of the mica forming material has been achieved.

After the mixture has been held at the desired temperature for sufficient time to achieve complete dissolution, the solution is gradually cooled. As the solution cools, it becomes less able to hold the dissociated ions which are combinable to form mica and precipitation occurs. The cooling may preferably first proceed relatively rapidly down to about 800° C. in order to make the solution quite viscous and this retards the tendency of the mica crystals to float to the top of the much denser liquid mass. At 1200° C. or perhaps even lower, the solution is sufficiently viscous to substantially retard this movement. However, undue viscosity retards crystal growth. Accordingly, a balance must be made between settling and crystal growth. After sufficient viscosity has been achieved the liquid is slowly cooled to permit the growth of crystals to desired size.

When finally cooled to room temperature, the solid mass may be removed from its container or crucible and ground to a powder, preferably to about 100 mesh. Thereafter, a small amount of water, not more than about 10% by weight, is added to the powder to act as a temporary binder and preforms are made. If compression molding techniques are employed, then the preform mixture will substantially be formed to the shape into which it will finally be molded. Thereafter, the preform is preheated to a temperature somewhere between 900° C. and 1000° C. and the preheated preform is then placed in a mold which has been preheated to a temperature between 350° C. and 450° C. The preferable preheat temperature for the preform will be about 950° C. and the preferable temperature of the mold will be about 400° C. The mold is then closed and the preheated preform is subjected to a pressure of about two tons per square inch. Thereafter, the molded article may, if desired, be transferred to an annealing furnace in which it is permitted to be gradually cooled to room temperature. After cooling, if desired, the surface of the molded product may be ground or otherwise treated to smooth it. The final ceramoplastic will have an excellent dispersion of uniform crystals of mica throughout the lead fluoride matrix, which dispersion cannot possibly be achieved by the former method of mechanically mixing mica and glass frit. This dispersion and uniformity of size of the mica results in uniformity of properties and an improvement in physical, chemical and electrical properties.

In lieu of compression molding, a fired product can be made. In using a firing technique a preform may be made by cold pressing in precisely the same fashion as the cold press preform is made prior to compression molding. Thereafter, the preform may be placed in a kiln without being subjected to pressure and it may be fired at a temperature between 800° C. and 850° C., preferably 850° C. for a time sufficient to cause the lead fluoride binder to recrystallize to form a complete matrix for the mica therein. Naturally, the firing time will depend on the size and shape of the preform. After the firing is completed it is preferable to slowly cool the fired product at a rate of approximately 100° C. to 200° C. per hour in order to prevent undue thermal stresses from being established therewithin. Thereafter, the surface of the product can be ground to eliminate any scale or the like and an excellent machinable material is available for use.

Generally, ceramoplastic materials preferably contain from 30% to 85% synthetic mica and from 70% to 15% binder. An excellent compression molded or fired product can be made with 65% mica and 35% lead fluoride. Accordingly, it may be desired to add to the ceramoplastic produced in accordance with the method prior to forming the preform additional natural or synthetic mica. Moreover, if desired, a small amount of mineralizer such as, for instance, cryolite or potassium aluminum fluoride ($K_3AlF_6$) may also be added prior to molding or firing.

While the above specification describes a method of making ceramoplastic having synthetic normal fluorphlogopite mica therein, the present method may be used with other raw batch materials for preparing other non-hydroxyl micas and other powdered non-hydroxyl micas such as, for instance, fluor-micas. Specifically, the present invention may be employed with other fluor-phlogopite micas such as, for instance, lithium tetra-silicic fluor-phlogopite mica ($KMg_{32}LiSi_4O_{10}F_2$) and barium di-silicic fluor-phlogopite mica ($BaNMg_3Al_2Si_2O_{10}F_2$).

While we have herein shown and described several forms of the present invention and have suggested various changes and modifications therein, it will be understood that various other changes and modifications may be made therein within the scope of the appended claims

What we claim is:

1. The method of making non-hydroxyl mica comprising the steps of dissolving non-hydroxyl mica forming material in heated lead fluoride solvent, and then cooling the resulting solution to cause non-hydroxyl mica crystals to precipitate out of said solution.

2. The method of making synthetic non-hydroxyl mica comprising the steps of dissolving raw materials which contain constituents chemically combinable to form said synthetic mica in a heated lead fluoride solvent, and then cooling the resulting solution to precipitate said synthetic mica therein.

3. The method of making synthetic normal fluor-phlogopite mica crystals comprising the steps of dissolving mica forming material of said mica in a heated lead fluoride solvent, and then cooling the resulting solution to cause said synthetic normal fluor-phlogopite mica crystals to precipitate out of said solution.

4. The method of making synthetic fluor-mica crystals comprising the steps of dissolving raw batch materials which contain constituents chemically combinable to form said synthetic fluor-mica in a heated lead fluoride solvent, and then cooling the resulting solution to cause said synthetic mica to precipitate out of said solution.

5. The method of making synthetic normal fluor-phlogopite mica crystals comprising the steps of dissolving normal fluor-phlogopite mica forming material in lead fluoride heated to above about 855° C., and then cooling the resulting solution to cause normal fluor-phlogopite mica crystals to precipitate out of said solution.

6. The method of making synthetic normal fluor-phlogopite mica crystals comprising the steps of dissolving normal fluor-phlogopite forming material in lead fluoride heated to between about 855° C. and 1250° C., and then cooling the resulting solution to cause said synthetic mica crystals to precipitate out of said solution.

7. The method of making synthetic mica crystals comprising the steps of mixing mica-forming material of said synthetic mica with lead fluoride, heating said mixture to dissolve said mica-forming material in lead fluoride, and then cooling the resulting solution to cause synthetic mica crystals to precipitate therefrom.

8. A method of growing synthetic normal fluor-phologopite mica crystals comprising the steps of heating lead fluoride to between about 855° C. and 1250° C., adding raw batch ingredients consisting essentially of about 19.77 percent potassium silico fluoride, 18.47 percent potash feldspar, 24.26 percent silica, 8.95 percent alumina, and 28.55 percent magnesia to said lead fluoride and dissolving at least a portion of said raw batch ingredients therein, and then cooling the resulting solution to cause synthetic normal fluor-phlogopite mica crystals to crystallize out of said solution.

9. A method of making synthetic normal fluor-phlogopite mica comprising the steps of heating lead fluoride to between about 855° C. and 1250° C. to form a liquid thereof, adding raw batch ingredients consisting essentially of potassium silico fluoride, potash feldspar, silica, alumina, and magnesia chemically combinable to form said mica to said lead fluoride, and dissolving at least a portion of said raw batch ingredients therein, and then cooling the resulting solution to cause normal fluor-phlogopite mica to precipitate out of said solution.

10. A method of making synthetic normal fluor-phlogopite mica comprising the steps of heating lead fluoride solvent to above about 855° C., taking raw batch ingredients consisting essentially of about 19.77 percent potassium silico fluoride, 18.47 percent potash feldspar, 24.65 percent silica, 8.95 percent alumina, and 28.55 percent magnesia, first adding to and dissolving in said heated lead fluoride said silica, alumina, and magnesia, then adding to and dissolving in the resulting solution said potassium silico fluoride and said potash feldspar to form a final solution, and then cooling said final solution to cause synthetic normal fluor-phlogopite mica to precipitate therefrom.

11. A method of recrystallizing synthetic normal fluor-phlogopite mica, comprising the steps of heating lead fluoride to about 1200° C., adding comminuted crystals of said synthetic normal mica to said lead fluoride and dissolving said crystals therein, and then cooling the resulting solution to crystallize said synthetic mica crystals therefrom.

12. A method of making synthetic normal fluor-phlogopite mica crystals comprising the steps of heating lead fluoride to between about 1150° C. and 1250° C., adding about 30 to 50 percent by weight of normal fluor-phlogopite mica forming material to and dissolving it in said lead fluoride and then cooling the resulting solution to grow said synthetic mica crystals therein.

13. A method of growing synthetic normal fluor-phlogopite mica crystals comprising the steps of heating lead fluoride to about 1200° C., adding about 40 percent by weight of normal fluor-phlogopite mica-forming material to and dissolving it in said lead fluoride, and then cooling the resulting solution to grow said synthetic mica crystals therein.

14. The method of making synthetic normal fluor-phlogopite mica crystals comprising the steps of mixing powdered normal fluor-phlogopite mica with powdered lead fluoride, said mica consisting essentially of about 30 to 50 percent of said mixture, heating said combined product to dissolve at least a portion of said mica in said lead fluoride, and then cooling the resulting solution to recrystallize said synthetic mica crystals therein.

15. A method of making a ceramoplastic material comprising the steps of dissolving at least 30% by weight of non-hydroxyl mica forming material in a lead fluoride heated to between 1150° C. and 1250° C., cooling the resulting solution at a rate to precipitate said non-hydroxyl mica therefrom and then to cause said lead fluoride to crystallize with a dispersion of said precipitated mica therein, grinding said solidified material, compressing at least a portion of said ground material into a preform, and then heating said preform to cause said lead fluoride to recrystallize to form a substantially continuous matrix for the mica dispersed therethroughout.

16. A method of making a ceramoplastic material comprising the steps of dissolving at least 30% by weight of non-hydroxyl mica forming material in a lead fluoride heated to between 1150° C. and 1250° C., cooling the resulting solution at a rate to precipitate said non-hydroxyl mica therefrom and then to cause said lead fluoride to crystallize with a dispersion of said precipitated mica therein.

17. A method of making ceramoplastic material comprising the steps of heating lead fluoride to between about 1150° C. and 1250° C., dissolving at least 30% by weight of fluor-mica in said heated lead fluoride, cooling the solution at such a rate as to cause the mica to precipitate out and to then cause the lead fluoride to crystallize to become a solid mass with the precipitated mica dispersed therethroughout, grinding said mass, compressing at least a portion of said ground material into a preform, and then heating said preform to cause said lead fluoride to recrystallize to form a substantially continuous matrix for the mica dispersed therethroughout.

18. A method of making ceramoplastic material comprising the steps of heating lead fluoride to between about 1150° C. and 1250° C., dissolving at least 30% by weight of normal fluor-phlogopite mica in said heated lead fluoride, cooling the solution at such a rate as to cause the mica to precipitate out and to then cause the lead fluoride to crystallize to become a solid mass with the precipitated mica dispersed therethroughout, grinding said mass, compressing at least a portion of said ground material into a preform, and then heating said preform to cause said lead fluoride to recrystallize to form a substantially continuous matrix for the mica dispersed therethroughout.

19. A method of making ceramoplastic material comprising the steps of heating lead fluoride glass to about 1200° C., dissolving about 40% by weight of non-hydroxyl mica in said heated lead fluoride, cooling the solution at such a rate as to cause the mica to precipitate out and to then cause the lead fluoride to crystallize to become a solid mass with the precipitated mica dispersed therethroughout, grinding said mass, compressing at least a portion of said ground material into a preform, and then heating said preform to cause said lead fluoride to recrystallize to form a substantially continuous matrix for the mica dispersed therethroughout.

20. A method of making ceramoplastic material comprising the steps of dissolving at least 30% by weight of raw materials which contain the ionic constituents of non-hydroxyl mica in substantially correct stoichiometric proportions in lead fluoride heated to a temperature between about 1150° C. and 1250° C., cooling said solution at a rate to cause the mica to precipitate out and to then cause the lead fluoride to crystallize to become a solid mass with the precipitated mica dispersed therethroughout, grinding said mass, compressing at least a portion of said ground material into a preform, and then heating said preform to cause said lead fluoride to recrystallize to form a substantially continuous matrix for the mica dispersed therethroughout.

21. A method of making ceramoplastic material comprising the steps of dissolving at least 30% by weight of raw materials which contain the ionic constituents of normal fluor-phlogopite mica in substantially correct stoichiometric proportions in lead fluoride heated to a temperature of between about 1150° C. and 1250° C., cooling said solution to a rate to cause the mica to precipitate out and to then cause the lead fluoride to crystallize to become a solid mass with the precipitated mica dispersed therethroughout, grinding said mass, compressing at least a portion of said ground material into a preform, and then heating said preform to cause said lead fluoride to recrystallize to form a substantially continuous matrix for the mica dispersed therethroughout.

22. A method of making ceramoplastic material comprising the steps of heating lead fluoride to a temperature of about 1200° C., adding to said lead fluoride at least 10% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lead fluoride, cooling said solution at a rate to cause mica to precipitate out and to then cause said lead fluoride to crystallize to become a solid mass with the precipitated mica dispersed therethroughout, grinding said mass, mixing temporary binder into said ground mass, then pressing said mixture into preform, then preheating said preform to a temperature between about 900° C. and 1000° C., then placing said preheated preform into a mold preheated to a temperature between about 350° and 450° C., and subjecting said preform to a pressure of about two tons per square inch.

23. A method of making ceramoplastic material comprising the steps of heating lead fluoride to a temperature of about 1200° C., adding to said lead fluoride at least 30% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lithium sulfate, cooling said solution at a rate to cause said mica to precipitate out and to then cause said lead fluoride to crystallize to become a solid mass with the precipitated mica dispersed therethroughout, grinding said mass, mixing additional ground crystalline mica with said ground mass, compressing at least a portion of said resulting mixture into a preform, and then heating said preform to cause said lead fluoride to recrystallize to form a substantially continuous matrix for the mica dispersed therethroughout.

24. A method of making ceramoplastic material comprising the steps of heating lead fluoride to a temperature of about 1200° C., adding to said lead fluoride at least 10% by weight of raw batch materials consisting essentially of 19.77% potassium silico fluoride, 18.47% potash feldspar, 24.26% silica, 8.95% alumina and 28.55% magnesia, dissolving at least a portion of said raw batch materials in said heated lead fluoride, cooling said solution at a rate to cause mica to precipitate out and to then cause said lead fluoride to crystallize to become a solid mass with the precipitated mica dispersed therethroughout, grinding said mass, mixing temporary binder into said ground mass, then pressing said mixture into preform, and then firing said preform at about 850° C. for sufficient time to cause said lead fluoride to recrystallize to form a substantially continuous matrix for the mica dispersed therethroughout.

References Cited by the Examiner

UNITED STATES PATENTS 3,057,741  10/62  Moore _____ 106—39

TOBIAS E. LEVOW, *Primary Examiner.*